United States Patent [19]

Daniels

[11] Patent Number: 5,308,372

[45] Date of Patent: *May 3, 1994

[54] VEGETABLE OIL PROCESSING TO OBTAIN NUTRIENT BY-PRODUCTS

[76] Inventor: Ralph S. Daniels, 80 Old Faith Rd., Shrewsbury, Mass. 01545

[*] Notice: The portion of the term of this patent subsequent to Jan. 6, 2006 has been disclaimed.

[21] Appl. No.: 925,814

[22] Filed: Aug. 4, 1992

Related U.S. Application Data

[63] Continuation of Ser. No. 598,777, Oct. 16, 1990, abandoned, which is a continuation of Ser. No. 197,058, May 20, 1988, abandoned, which is a continuation-in-part of Ser. No. 179,280, Apr. 8, 1988, Pat. No. 4,836,843, which is a continuation of Ser. No. 26,052, Mar. 16, 1987, abandoned, which is a continuation of Ser. No. 886,937, Jul. 21, 1986, abandoned, which is a continuation of Ser. No. 738,742, May 29, 1985, abandoned, which is a continuation of Ser. No. 575,455, Jan. 31, 1984, abandoned, which is a continuation-in-part of Ser. No. 572,202, Jan. 18, 1984, abandoned.

[51] Int. Cl.$^5$ .............................. C05F 7/00; C11B 1/04
[52] U.S. Cl. .............................................. 71/25; 71/40; 71/41; 71/43; 71/64.1; 71/DIG. 2
[58] Field of Search ................... 71/23, 25, 37, 40, 41, 71/43, 64.1; 426/807

[56] References Cited

U.S. PATENT DOCUMENTS

| | | | |
|---|---|---|---|
| 2,288,418 | 6/1942 | Partridge | 23/106 |
| 2,758,122 | 8/1956 | Clayton | 260/397.25 |
| 2,812,343 | 10/1957 | Cox et al. | 260/413 |
| 2,848,468 | 8/1958 | Wijnberg | 260/425 |
| 2,876,242 | 3/1959 | Thurman | 260/425 |
| 2,877,249 | 3/1959 | Kelley | 260/418 |
| 2,917,525 | 12/1959 | Thurman | 260/425 |
| 2,939,790 | 6/1960 | Clayton | 99/2 |
| 2,970,910 | 2/1961 | Thurman | 99/2 |
| 2,991,178 | 7/1961 | Clayton | 99/2 |
| 3,008,972 | 11/1961 | Mitani | 260/425 |
| 3,093,667 | 6/1963 | Fiala | 260/424 |
| 3,102,898 | 9/1963 | Schmitt | 260/425 |
| 3,425,938 | 2/1969 | Bloomberg et al. | 210/59 |
| 3,428,660 | 2/1969 | Morren | 260/412.5 |
| 3,576,709 | 4/1971 | Menzies | 162/16 |

(List continued on next page.)

FOREIGN PATENT DOCUMENTS

| | | |
|---|---|---|
| 976932 | 8/1964 | Fed. Rep. of Germany . |
| 1963002 | 6/1971 | Fed. Rep. of Germany . |
| 52-5571 | 6/1977 | Japan . |
| 774532 | 5/1957 | United Kingdom . |

OTHER PUBLICATIONS

Woerfel, "Alternatives for the Processing of Soap-stock", Journal of the American Oil Chemists' Society, vol. 60, Feb. 1983.

Eckenfelder "Wastewater Treatment" *Chemical Engineering*, Sep. 1985 pp. 60–74.

Institute of Shortening and Edible Oils, Inc. "Treatment of Wastewaters from Food Oil Processing Plants in Municipal Facilities" Oct. 1985.

"Proceedings: World Conference on Emerging Technologies in the Fats and Oils Industry" American Oil Chemists' Society, Aug.–Sep. 1986, pp. 146–149, 149–153, 165–168.

Daniels "Fertilizer Process", International Patent Application PCT/US85/00078 published Aug. 1, 1985.

*Primary Examiner*—Ferris Lander
*Attorney, Agent, or Firm*—Staas & Halsey

[57] ABSTRACT

A method of processing vegetable oil in which non-toxic reagents are used, so that a waste stream is evolved suitable for use as a nutrient source and wherein the non-toxic reagents include nutrient components whereby the nutrient value of the waste stream is enhanced.

5 Claims, 6 Drawing Sheets

U.S. PATENT DOCUMENTS

| | | | |
|---|---|---|---|
| 3,629,307 | 12/1971 | Marino et al. | 260/429 |
| 3,653,842 | 4/1972 | Putman | 23/253 A |
| 3,700,704 | 10/1972 | Zambone | 260/425 |
| 3,708,275 | 1/1973 | Camp, Jr. | 71/1 |
| 3,787,460 | 1/1974 | Gadefaix et al. | 260/418 |
| 3,804,819 | 4/1974 | Wengrow et al. | 260/418 |
| 3,856,834 | 12/1974 | Marsden et al. | 260/425 |
| 3,926,610 | 12/1975 | Kenton | 71/34 |
| 3,943,155 | 3/1976 | Young | 260/424 |
| 3,974,069 | 8/1976 | Nettli | 210/45 |
| 3,975,270 | 8/1976 | Teranishi et al. | 210/53 |
| 4,035,402 | 7/1977 | Levine | 260/425 |
| 4,100,181 | 7/1978 | Phillips et al. | 260/416 |
| 4,118,407 | 10/1978 | Red et al. | 260/412.5 |
| 4,179,457 | 12/1979 | Crawford | 260/418 |
| 4,188,290 | 2/1980 | Graham et al. | 210/21 |
| 4,229,202 | 10/1980 | Mullerheim et al. | 71/8 |
| 4,276,227 | 6/1981 | Kirby | 260/425 |
| 4,280,962 | 7/1981 | Watanabe et al. | 260/424 |
| 4,361,517 | 11/1982 | Duff et al. | 260/412.5 |
| 4,836,843 | 6/1989 | Daniels | 71/40 X |

DANIELS FERTILIZER PROCESS

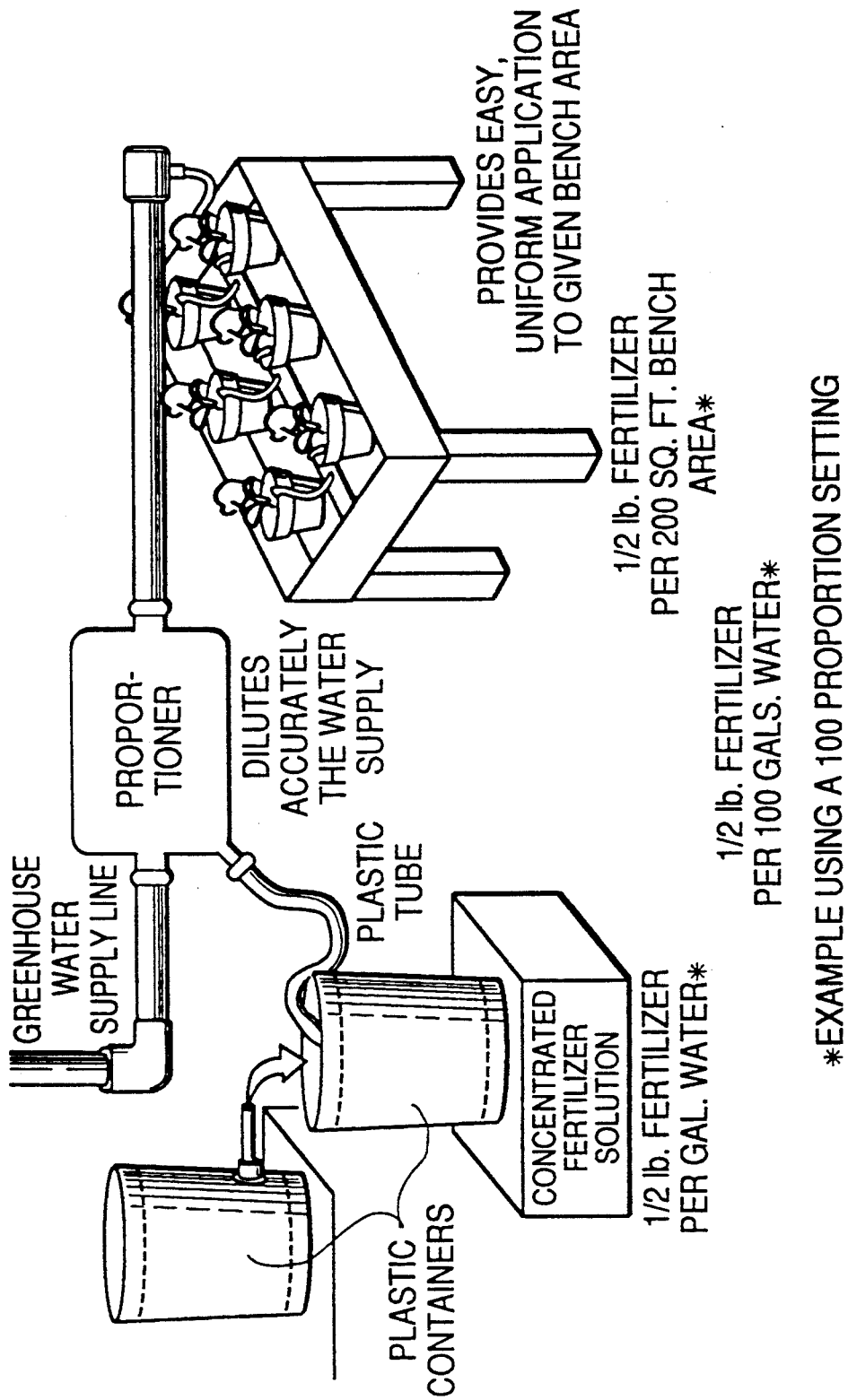

VEGETABLE OIL PROCESSING TO OBTAIN NUTRIENT BY-PRODUCTS

This application is a continuation of Ser. No. 07/598,777 filed Oct. 16, 1990, and now abandoned, which was a continuation of Ser. No. 07/197,058 filed May 20, 1988, now abandoned, which was a continuation-in-part of application Ser. No. 07/179,280 filed Apr. 8, 1988, now U.S. Pat. No. 4,836,843 issued Jun. 6, 1989, which was a continuation of Ser. No. 07/026,052 filed Mar. 16, 1987, now abandoned, which was a continuation of Ser. No. 06/886,937 filed Jul. 21, 1986, now abandoned, which was a continuation of Ser. No. 06/738,742, filed May 29, 1985, now abandoned, which was a continuation of Ser. No. 06/575,455 filed Jan. 31, 1984, now abandoned, which was a continuation-in-part of Ser. No. 06/572,202 filed Jan. 18, 1984, now abandoned.

TECHNICAL FIELD OF THE INVENTION

This invention involves both the field of vegetable oil refining and the field of nutrient material manufacture.

BACKGROUND OF THE INVENTION

Vegetable Oil Refining and Waste Water

Vegetable oils are natural fats which occur in the seeds of oil-seed plants such as soybean, cotton, corn and sunflower.

The oils are solvent extracted and refined for edible use as cooking oil (e.g., Wesson Oil TM), shortening (e.g., Crisco TM), salad dressings, mayonnaises and margarines.

Vegetable oil refining essentially involves the removal of free fatty acids (FFA) and gums (to a lesser extent) from the crude oil. Gum removal is sometimes facilitated by addition of traces of phosphoric acid. The refining is accomplished by mixing the oil with a hot, aqueous caustic solution (sodium hydroxide) and centrifugally separating the reaction products from the "refined" oil. The waste product, an alkaline mixture of saponified FFA and gums is referred to as soapstock.

The soapstock waste has commercial value, because of the fatty acid content as a high energy seed supplement, but must be processed further in order to render it salable. Processing simply amounts to breaking or splitting the soap into oil and water again by adding acid (Sulphuric acid) to approximately pH 1.5. After heating and mixing thoroughly, the acidulated soapstock is allowed to settle out. The oil that floats to the top is called "acid oil" and is drawn off for sale usually as an animal feed supplement. The aqueous phase remaining is termed "acid water". Acid water is the final waste product and is discarded. However, there is a disposal problem. Acid water contains all the undesirable and objectionable pollutants of the refining process. Sewer authorities at a bare minimum require that the acid water be neutralized (NaOH is added) before the waste is allowed to be dumped. Some states have more stringent pollution control and have forced companies out of business because of acid water disposal.

Thus, in the conventional refining of vegetable oils, sodium hydroxide is used as the refining base, sulfuric acid used to acidulate soapstock and sodium hydroxide again employed to neutralize acid water.

Although established and inexpensive, this technology results in a waste product that, due to environmental legislation, has become increasingly difficult and costly to dispose of.

Since all of chemicals used to refine, acidulate and neutralize together with the undesirable constituents of crude oil, gums etc., are found in concentrated form in the acid water, examination of acid water will show it to be high in BOD, soluble salts and phosphorus. The soluble salts are primarily sodium sulfate and sodium phosphate. The sodium comes from the refining base (NaOH) and the acid water neutralizer (NaOH); the sulfate from the acidulating acid ($H_2SO_4$); the phosphorus from naturally occurring phosphatides (gums), which are hydrolyzed during acidulation into phosphate, and pretreat or process additions of phosphoric acid. Plant protein and carbohydrate fragments together with glycerol and residual oil produce the high BOD levels.

Enactment of environmental legislation has caused the disposition of soapstock and, in particular, acid water to become an increasingly difficult and costly problem. Not only is acid water highly acidic, it is high in b.o.d. and phosphorus. Several localities have strict effluent standards which force refiners to ship soapstock to an area with more liberal regulations where it can be acidulated.

In 1982 a privately funded research program was initiated to attempt to discover novel treatment processes for a large volume industrial waste product, the disposal of which had gained the attention of the Environmental Protection Agency (E.P.A.).

Phosphorus, the main component of the industrial waste, was creating a pollution problem which gained national and international attention—the eutrophication of a valuable natural resource, rivers and lakes. The E.P.A. focused on the problem and many plants/businesses were forced to close for non-compliance with the Federal Water Pollution Control Act (Clean Water Act) of 1972 and amendments of 1977 and 1981.

Additional emphasis was placed on the waterways of the Great Lakes Basin area of the U.S. and Canada. *The Great Lakes Water Quality Agreement of 1978* was signed and the *International Joint Commission* was established by the United States and Canada. The new Agreement reinforces the importance of controlling phosphorus pollution. The importance of this continuing effort to enforce stricter standards is of special concern, since the Great Lakes region has one of the highest densities of industries that generate the waste product in the world.

At present, there is no treatment technology available to industry that will meet proposed E.P.A. standards.

According to a recent statement by W.R. Grace Company:

"In an effort to address the environmental concerns that this industry faces, W.R. Grace is pioneering a new refining technology-Modified Caustic Refining (MCR).
MCR utilizes TriSyl's ability to adsorb significant quantities of phosphatides and soap, thereby eliminating the need for the water wash centrifuge step. Elimination of this unit operation results in lower wastewater treatment costs, and improved adsorbent utilization."

This demonstrates the importance of environmental concerns that the vegetable oil industry is facing.

W.R. Grace is promoting a method that reduces the remaining soap and phosphatides from once refined oil that previously was removed by a water wash, which shows that the industry struggles to find a cost efficient technology or method, or any technology, that prevents or minimizes the residual amounts of soap and phosphatides from the environment.

A recent issue of *Water Pollution Control Facilities* magazine further indicates the general doctrine of water pollution control: that the so-called "nutrients" (nutrients apparently relate to the extent that the component causes undesirable plant growth in waste water streams) is an undesirable nuisance which must be removed from the waste water stream using sophisticated separation techniques. This feeling in the pollution control art probably derives from the fact that the fundamental doctrine of those now working in the waste water field is that waste water is something that is supposed to be ejected from the system. This narrow-minded doctrine probably derives from the inbred historical paranoia in western civilization concerning waste water.

Nutrient Industry

The horticulture industry and hydroponic-growing represent one of the fastest growing areas of the agricultural market. In 1980 the USDA Crop-Reporting Board showed that foliage production was up 11% from 1979. In 1981 the USDA reported a 7% increase in the wholesale value of all sales of floriculture crops to $1,020,000,000.

As the horticulture market expands, so does the demand for high-grade fertilizer. The potential for continuing the growth is indeed impressive. A comparison of the American and European consumer buying habits shows that Europeans buy 10.1 fresh flowers and plants per capita against only 1.9 in the United States. The differential is strikingly similar to the American-European wine consumption pattern that existed only 10-15 years ago. As the horticulture industry becomes more mass-merchandise oriented and steps up its promotional efforts to take advantage of the potentials, the demand for fresh flowers and plants will be enormous.

The greenhouse-grown plant industry represents the technological leading edge of agricultural science and business. Computers select which crops should be grown and control water and nutrient flows. Genetically-engineered seeds and plants are grown without soil in artificial atmospheres, fed with chemical solutions and covered with thermal blankets. The result is predictable-quality, higher yields, shortened growing times and maximized profitability.

The industry is continually striving to reduce costs and quickly implements new techniques and products that increase efficiency. It is interesting to note that in such a scientifically dynamic and eager market, no new technology or product for the chemical feeding of greenhouse crops has been introduced in many years. All major fertilizer companies make virtually the same non-innovative 25-pound bags of dry, granulated fertilizer.

Since the professional grower employs sophisticated water and fertilization equipment, he requires specialized premium-quality fertilizers. The most important property of premium fertilizer is that it dissolve completely in water and that the resultant solution is particle-free. The purpose of these seemingly simple but extremely important requirements is that the grower prepares a concentrate nutrient solution to be added in precise amounts to the watering system. This is done by means of a proportioner which injects enough fertilizer to make 100–400 parts per million dilution.

Not only is the proportioning meter sensitive, but the delivery system employs hypodermic syringe-like tubes which are easily clogged by insoluble matter. Clogging subsequently requires costly and time-consuming cleaning. The grower cannot afford to jeopardize his crops to equipment downtime and accordingly pay a premium for high-quality products (i.e., high solubility and, therefore, high availability of nutrients to the plant).

BRIEF SUMMARY OF THE INVENTION

In general the process of the invention utilizes the waste products of vegetable oil refining to create fertilizers for sale to agronomic and horticultural markets. The process views acid water as a resource recovery opportunity rather than a waste disposal problem. By employing "nutrient" chemicals, waste products which reduce margins become by-products that generate revenues and profits. The process is cost effective, utilizes standard equipment, permits compliance with the strictest effluent regulations, permits fatty acids to be recovered for full value on site, soapstock to be acidulated on-site rather than sold to acidulators below market values, offers the most ecologically desirable approach to managing process waste and presents the opportunity to refiners to employ the first closed-loop agricultural process system.

The simplest example of this philosophy is to replace sodium hydroxide with ammonia for the neutralization of acid water. Not only is there a substantial savings in chemical costs realize but, importantly, the compounds formed—ammonium sulfates and ammonium phosphates—are salable fertilizers. The acid water can be so treated as to retain residual growth hormone from the vegetables, residual pesticides, surfactants and other ingredients which enhance its fertilizing capabilities.

Fertilizers for sale to the premium horticultural market can be produced by making additional changes. Substituting potassium hydroxide for sodium hydroxide in the refining step; acidulating the potassium soapstock with a combination of sulfuric and phosphoric acids in a prescribed manner; and then neutralizing the acid water with ammonia or potassium hydroxide will produce a multinutrient fertilizer containing N, P, K and S as well as desirable trace element micronutrients.

In either case the production of fertilizers for sale is both more cost effective and ecologically desirable than the disposition of a waste product.

Soapstock does not have to be treated with any $H_3PO_4$ to make fertilizer. The $H_3PO_4$ can be added after the soapstock is acidulated with $H_2SO_4$ or not at all. There is $PO_4$-3 (from naturally occurring gums) already in the acid $H_2O$ and if additional $PO_4$-3 needs to be supplemented, it can be done with $H_3PO_4$ (which, unless otherwise indicated, needs to be subsequently neutralized with base)). Or the acid water, before or after neutralization, can be supplemented with phosphate by addition of phosphate compound, salt, like MAP, DAP - MONO or di-ammonium phosphate.

The way to "best" make fertilizer from the oil refining process may then be to:
1. Refine crude oil with potassium base (KOH), (other K salts may potentially be used).
2. Acidulate potassium soapstock with sulfuric acid ($H_2SO_4$).
3. Separate acid water from acid oil. At this point, the acid water contains: N (from gums) in a small %

P$_2$O$_5$-(from phosphatides)
K (from soapstock refinate)
S (from H$_2$SO$_4$ acidulation)

4. The acid water can be neutralized with a nitrogen base if desired (makes the best economic sense) like ammonia NH$_3$, aqua (NH$_4$OH) or with KOH if a specialty product is to be made (horticultural fertilizer).

Supplemental N or P can be added via MAP/DAP - or NH$_4$NO$_3$—urea or not at all. If urea is used better stability can be achieved by adding it later in the neutralization step.

The acid water from the potassium soapstock, acidulated with H$_2$SO$_4$, and neutralized with NH$_3$, can be used as is (as a liquid) or concentrated by evaporation (still as a liquid); or concentrated far enough to cause crystallization of salts and continuously removing them.

Depending upon the phosphatide content of the crude oil (non-degummed oils are preferred) and the chemicals and techniques used in refining, the concentration of salts in the "neutralized acid water" is approximately 20%.

Since it is desirable to produce a high analysis product, the dilute fertilizer solution should be concentrated. This can be accomplished by evaporation of water by natural or mechanical means, or by addition of material to upgrade the analysis.

If market demands require that a slurry or solid product be produced, crystallization techniques can be employed to make a variety of products.

Examination of the neutralized acid water will show a solution of multinutrient fertilizer: nitrogen from hydrolyzed phosphatides and ammonia; phosphorus (P$_2$O$_5$) from gums and phosphoric acid process additions; potassium (K$_2$O) from the refining caustic; and sulfur (as sulfate) from the sulfuric acid acidulation. In addition, naturally occurring trace elements from the oilseed are present in free or chelated form.

Virtually everything present in this solution is beneficial to plant growth as, in fact, it is derived from plant seed material. This process can be considered to be a true closed-loop agricultural process system. What the plant removes from the soil is concentrated in the seed, removed during oil refining and replaced into the soil for the next crop cycle.

The fertilizer solution can be used as a liquid or crystallized to a solid. Several crystal forms are possible, but the predominant salt is a potassium, ammonium - phosphate, sulfate.

Many process variables are possible in order to tailor the final fertilizer preparation. One unique approach is to acidulate the potassium soapstock with sulfuric acid to a first pH below 7 and then complete the acidulation with phosphoric acid. By performing the acidulation in this manner all the phosphate added is found in the water phase, where it is wanted, without expensive losses in the oil phase. This procedure permits the relative percentages of sulfur and phosphorus to be varied considerably.

In another aspect of the invention, it may be preferable to use Ca(OH)$_2$ as a nutrient neutralizer of acid water to produce calcium phosphate for use as a feed supplement to animals (i.e., an animal fertilizer).

It may be preferable to refine crude oil with Ca(OH)$_2$ in order to have the Ca in the acid water.

BRIEF DESCRIPTION OF THE DRAWINGS

Specific embodiments of the invention are shown inthe drawings, wherein:

FIG. 6 shows a particular application of the resulting product in a horticultural setting.

DETAILED DESCRIPTION OF THE INVENTION

Basic Version

Figure 1:
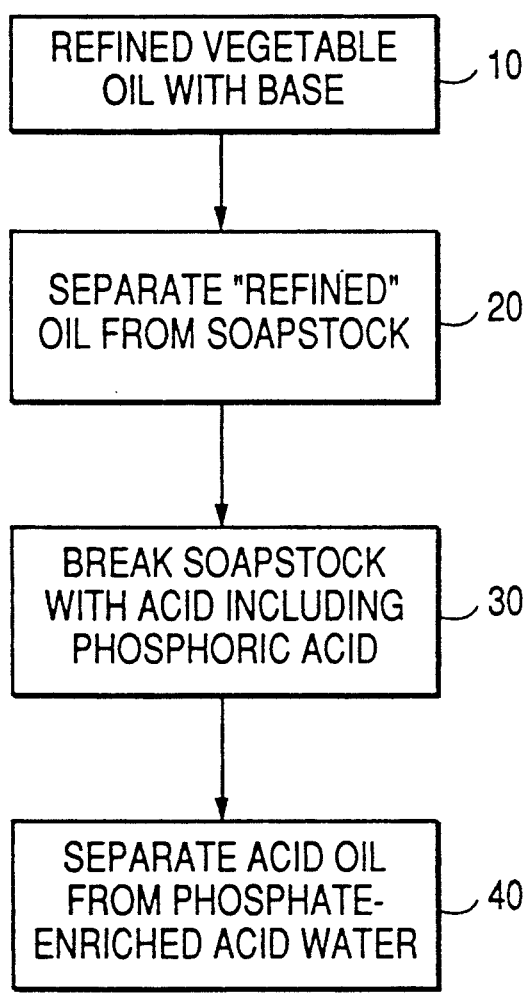
FIG. 1 is a flow diagram of an embodiment of the process.
Figure 2:
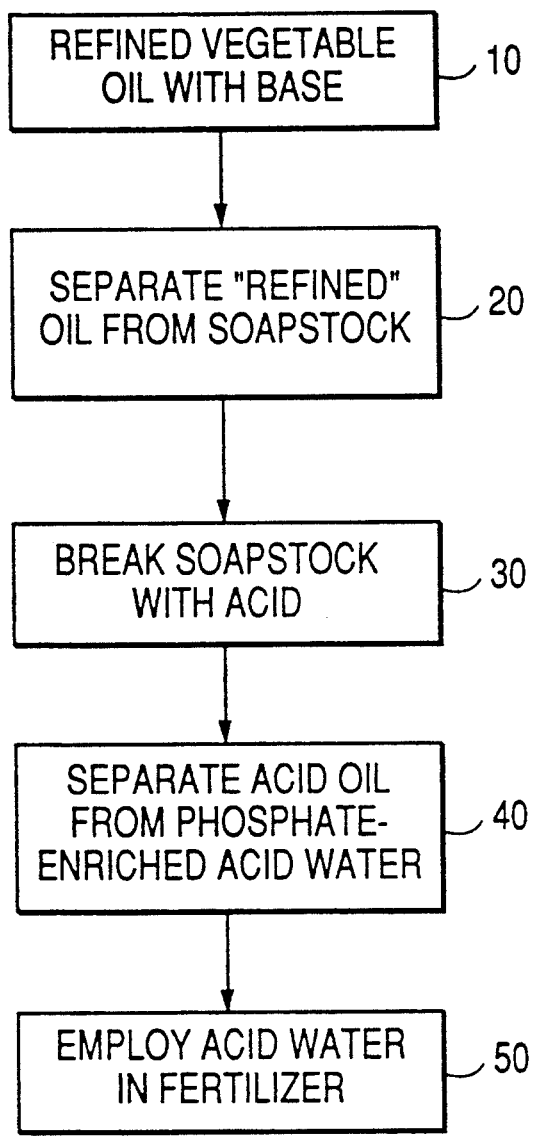
FIG. 2 shows a varient of the process.
Figure 3:
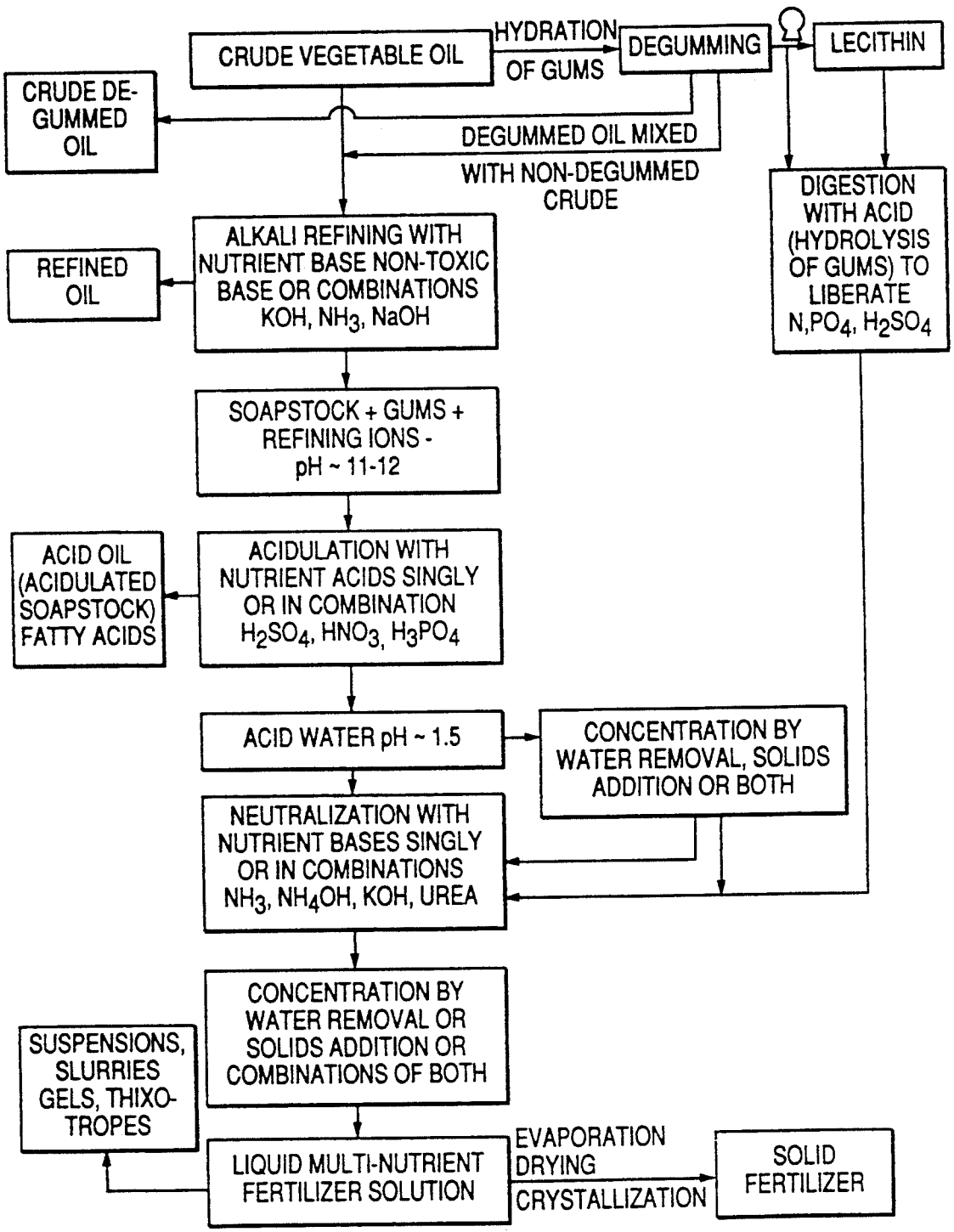
FIG. 3 illustrates a number of varients in one flow diagram.
Figure 4:
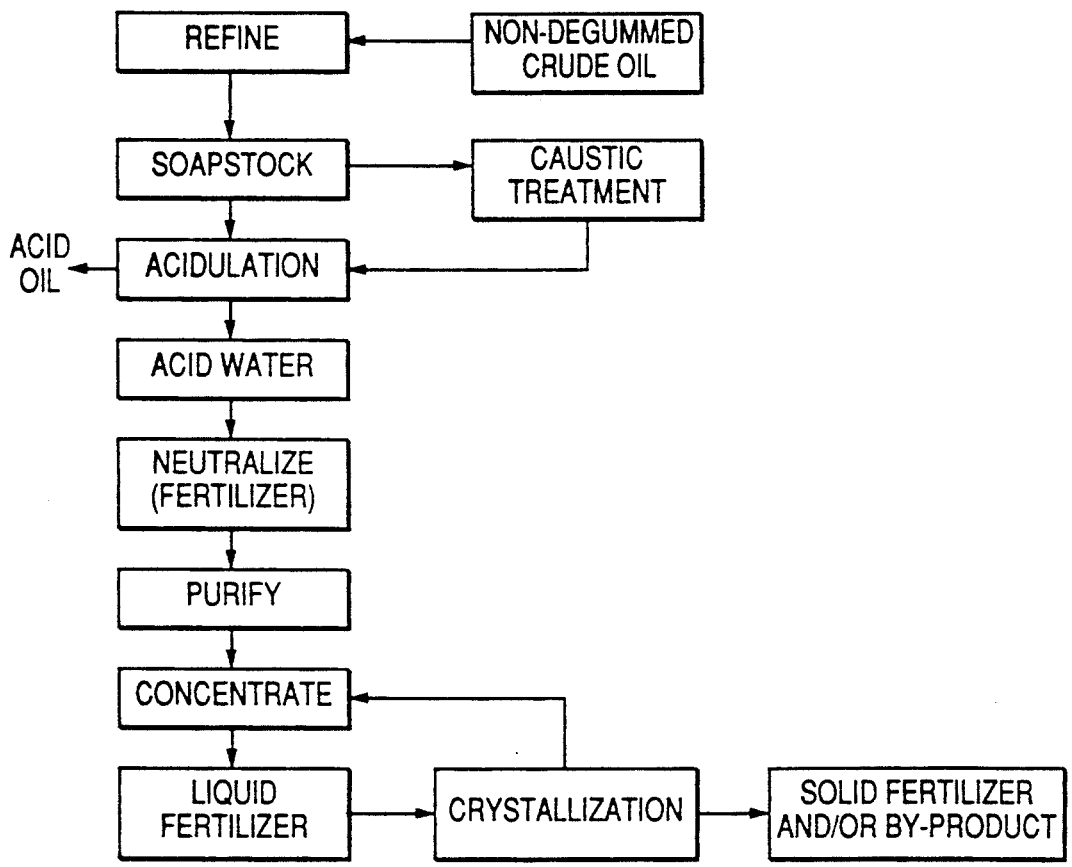
FIG. 4 is a general illustration of the process.
Figure 5:
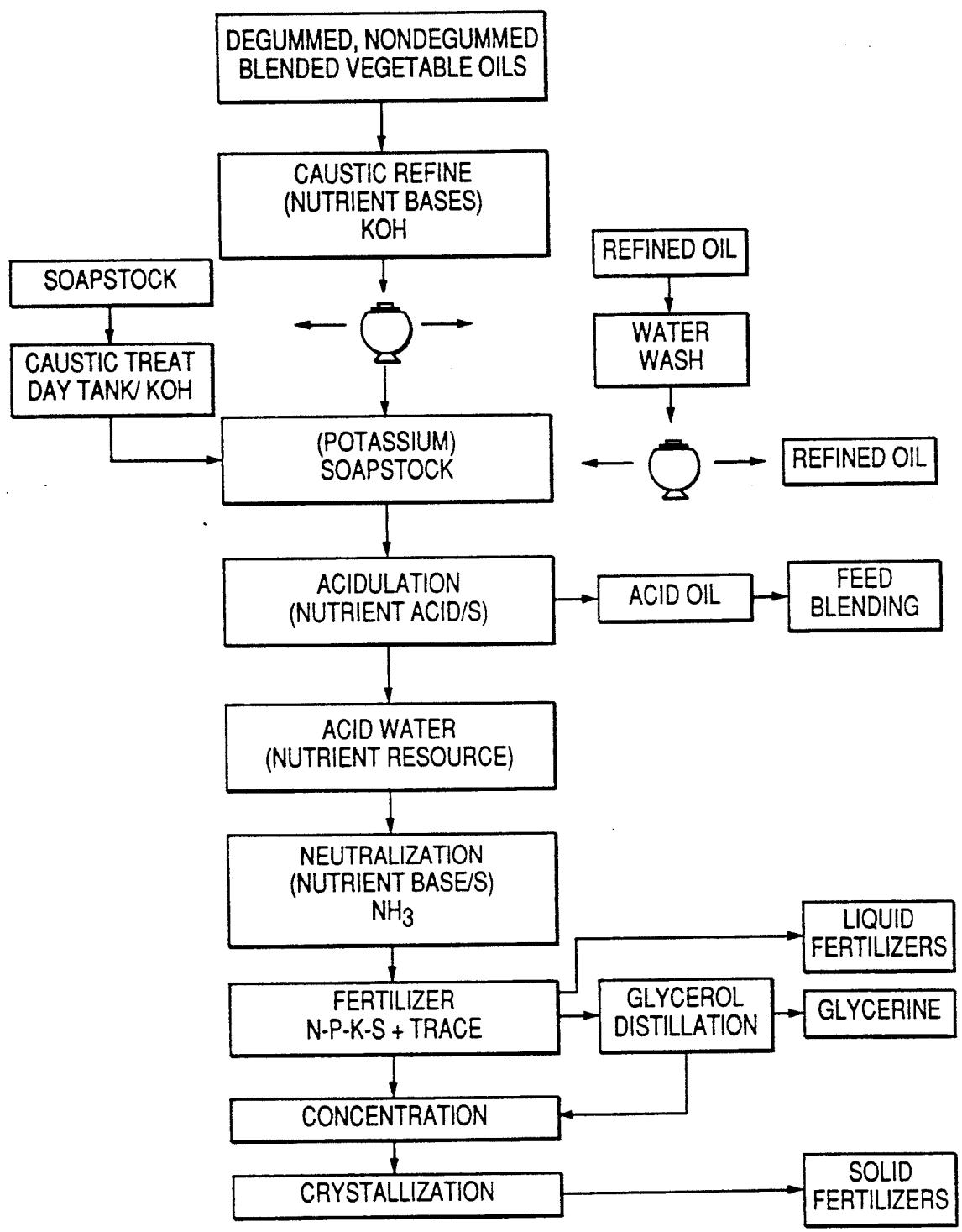
FIG. 5 illustrates another varient.

In 1982 a feasibility study was conducted to determine if better utilization of soapstock (higher value for the fatty acids in the acid oil) could be realized. The study was promising enough to warrant further development, and formally commenced in August 1983.

The initial goals for the development program were to produce a higher grade of fatty acid from the soapstock for use in an industrial soap solution and capturing the alkali stream used in the above for conversion to tri-sodium phosphate. However, after some marketing studies were done, it was decided that it made more sense to make and market a liquid fertilizer concentrate from the aqueous phase of the acidulated soapstock rather than use the water for a TSP solution.

The first fertilizer product to be made was a 20-20-20 formulation (NPK—nitrogen, phosphorus, potassium) as a concentrate that was equivalent to dissolving 4 pounds of dry commercial 20-20-20 in water to make 1 gallon. Laboratory tests supposedly demonstrated that there was no problem maintaining a stable solution at below freezing temperatures. However, at the time when the product was to be made in production and shipped in 25 gallon drums, a solubility problem arose. Crystallization was occurring at room temperature due simply to oversaturation. Since this problem was physical, there was no practical solution.

The direction I took was a "back-to-basics" look at acidulating soapstock. Because of cost, sulfuric acid is used to split soapstock into acid oil and acid water. However, if fertilizer is the final objective, perhaps phosphoric acid can be used to acidulate—its 5 times higher cost justified by capturing all the phosphate in the water, thus providing the P in the standard NKP formulation. This had been tried once before and rejected when the water was analyzed for phosphate and only traces were found. However, the approach taken was to maintain the integrity of the fatty acid and, accordingly, acidulation was done only to pH 7. My initial experiments were designed to acidulate the soapstock to pH 6, 5, 4, 3, 2, and 1.5 and then analyze both the acid oil and the acid water for phosphate. If this proved commercially feasible, I would then refine crude soybean oil with potassium hydroxide rather than the industry standard use of sodium hydroxide (NaOH is cheaper than KOH) and analyze for potassium in the water. I would then make a decision on the commercial use of KOH based on the amount captured in the water and thus providing the K component of the NPK formulation.

The results of the phosphoric acid acidulations showed that too much phosphate was tied up in the acid oil to warrant use economically. However, the observation that most interested me was that *the amount of phosphate in the acid oil was essentially constant* and the additional acid used to reduce the pH was accordingly found in the water as increasing concentration of phosphate. The percentage of phosphate in the oil ranged from 2.3 to 3.0 on a weight-weight basis. Based on this result, I hypothesized using sulfuric acid first to acidulate to a given pH and then using phosphoric acid to reduce the pH to 1.5. The above acidulation experiments were repeated but sulfuric acid was used to bring the pH to 6 and then phosphoric acid used to reduce pH 1.5; sulfuric acid to pH 5 then phosphoric acid to pH 1.5 and so on. These results proved even more interesting.

The analysis of the acid oil for phosphate and acid water for phosphate and sulfate showed that the amount of phosphate in the oil again remained constant, but it was only present in greatly reduced amounts, 0.57% to 0.82% on a weight-weight basis. As would be expected, the respectively increasing amount of sulfuric acid found its way into the water as increased percentages of sulfate, and the phosphoric acid as decreased amounts of phosphates. However, with such a small amount of phosphate trapped in the oil, the process was commercially feasible since the bulk was dissolved in the water. It had the commercial advantage of using less sulfuric acid to acidulate and an almost complete capture of phosphate—a commercial advantage in making fertilizer.

As if that were not enough, the most important discovery was made in reviewing the results quantitatively to cross check the exact amounts used against the exact amounts found. What I discovered was that in every case there was more phosphate in the water than was used in the acidulation with phosphoric acid. At first I questioned the laboratory methods and results. I then analyzed the soapstock before acidulation for phosphate. This provided the answer. The soapstock contained phosphorus bearing compounds that were removed from the crude soybean oil during the refining process (gums, etc.) that together with the phosphoric acid added in minute amounts to the crude oil (500 ppm) to facilitate gum removal were released into the acid water during the acidulation process. This discovery greatly enhances the economics of the liquid fertilizer since phosphate is the most expensive component of the NPK formulation. 1-2% phosphate was found in the soapstock and a comparable amount was found in the acid oil and water. This is a significant amount in that a 1 pound per gallon concentration of dry commercial 20-20-20 fertilizer in water is approximately 1.9% by weight.

This discovery suggested analysis of the acid water in conventional soapstock processing (with sulfuric acid) to determine if the phosphate is present. Analysis of the acid water from conventional soybean processing indicated the presence of sufficient phosphate to justify use of the acid water as a fertilizer after reducing the acidity, especially with a nutrient-type base such as urea or ammonium hydroxide.

After realizing the commercial significance of the phosphate discovery, it logically followed to analyze the acid water for nitrogen. It was found to be present at 0.16% which, although a small amount by itself, does represent 8-10% of the organic nitrogen requirement in the heretofore mentioned 1 pound per gallon of 20-20-20.

Therefore, the significance of these experiments, conclusions and discoveries is the practical and commercial use of a waste product that, otherwise, requires chemicals and equipment to treat, is a pollution control problem, and costs money to throw away.

The fertilizer, depending upon the final formulation (i.e., the ingredients added and their respective concentrations), has wide use for most agricultural crops. In addition, when properly formulated and packaged has special advantage in the greenhouse grown plant industry. This industry requires a higher quality fertilizer for specific application. Presently, the grower is dissolving solid granular fertilizer in a concentration of 1 pound per gallon of water and using this concentrate to feed the daily watering with a precise quantity of nutrients. There are several disadvantages inherent in using dry fertilizers in this way. First the fertilizer must be mixed until it is completely dissolved (this takes time and is inconvenient), secondly and most important, the watering systems used in the greenhouse have become very precise and employ tubes and fittings of very small diameters hypodermic syringe like. They tend to get clogged up with insolubles present in greater or lesser degree with all solid fertilizers. A liquid based fertilizer not only eliminates the above problems, but also contains less "fill" or superfluous ingredients that tend to compromise the integrity of the growing medium. Most of the "fill" is water.

The product to be manufactured is a supersaturated solution using acid water as the starting vehicle, and adding sufficient Nitrogen and urea and/or ammonium nitrate; Phosphoric acid; Potassium hydroxide for K and other micronutrients as salts or chelates (Sulfur is present in varying degrees depending upon how much is used/required when acidulation is done) to proper concentrations to make a desired final product, i.e., 20-20-20, 5-10-30, etc.

The supersaturated solutions will be formulated at a concentration equivalent to 5 pounds per gallon at a temperature of approximately 100 degrees F. (the ingredients are soluble at this temperature) and packaged in 5 gallon containers (bag in box). The 5 gallon containers will contain the equivalent of 25 pounds of dry fertilizer: the industry uses 25 pound bags. When the temperature drops, the solution will crystalize out as expected. However, this does not pose a problem anymore. This grower need only pour the "slurry" into a container and add water to make 25 or 50 gallons as he currently does with one or two 25 pound bags to 25 to 50 gallons of water. The crystals dissolve almost instantly, thus producing a concentrate of 1 pound per gallon with no time needed for mixing and no suspended particles.

One of the best ways to produce the product initially would be to refine the crude oil with potassium hydroxide; acidulate the potassium soapstock with sulfuric acid to pH 7 and below (depending upon how much sulfate is required) and finish the acidulation with phosphoric acid to pH 1.5. The product would then be analyzed for NPK and nutrient would be added to a desired final formulation.

Variant Process

A fertilizer was manufactured as follows:
a. Sodium soapstock (crude oil refined with NaOH) was acidulated with $H_2SO_4$ to approximately pH 3 and phosphoric acid added to approximately pH 2. The acid oil was separated from acid water.

b. The acid water containing Na, $SO_4$, $PO_4$, plus some nitrogen and trace amounts of micronutrients—Cu, Fe, Mg, etc. was used to make a liquid fertilizer as follows:

1. $H_3PO_4$ added to the aqueous mixture sufficient to make final $P_2O_5$ concentrate (15-20%). This keeps the solution acidic throughout the entire process so that N is not lost as $NH_3$.
2. Ammonium Nitrate was dissolved in the solution. This salt adds Nitrogen in the ammonium form and nitrate form. Since urea is also added, the amounts of each can be varied to produce the desired ratio of Ammonium Nitrate-Urea- to supplement the N already in solution from natural sources. Solution temperature drops (negative heat of solution). Urea is added after the solution is neutralized (approx. pH=6.5) and the solution is hot.
3. The solution was neutralized with KOH (solid dissolved in $H_2O$) in solution. The amount of KOH needed to neutralize the acid was "coincidentally" the amount necessary for the desired end concentration (15-20%) $K_2O$ equivalent. Solution gets very hot. $NH_3$ is liberated if KOH is added too quickly.
4. Urea was then added to bring the concentration of N to the desired 15-20% equivalent.

c. The fertilizer (a 20-20-20 equivalent in liquid concentrate form) was fed to plants- tomatoes, pot mums, etc.—in 100, 200, 400 ppm Nitrogen concentrations using a fertilizer proportioner and dribble tubes to each plant. The plants were grown in a greenhouse under conditions set by the Ball Seed Co. The same number of plants were fertilized with "Peters" TM 20-20-20 stock solution of fertilizer prepared from solid fertilizer dissolved in water. The plants were grown in a soilless medium. The crops were grown from seedlings to maturity and compared for differences, examined for problems during the crop cycle and evaluated for a number of criteria. Overall, the Peter formulation was judged superior in "growing efficiency" however, the product from the present process was not that far behind.

The important observation to note is that the fertilizer of the invention was formulated for this test with acid water produced from refining oil with sodium hydroxide (NaOH) and therefore this formulation had a substantial amount of Na+ present. Also present was a substantial amount of Cl. Both of these came from the NaOH used in refining crude oil. Since these are extraneous ions, they will retard the efficiency of a chemical fertilizer fed to plants in a soilless media—raises salt index, etc. If a rayon-grade NaOH is used (lower Cl present), the Cl− can be brought down to tolerable levels and therefore should improve the efficiency of the fertilizer or if the best formulation is produced, using KOH to refine (also low Cl− grade) then there are no undesirable ions/salts in the preparation and accordingly the fertilizer will perform better in a growing test-comparison. On the other hand, some crops such as sugar beets, tolerate NaCl in fertilizer. In such cases this varient may have special applicability.

Additionally, it is important to note is that plants grown traditionally in soil have a substantially greater tolerance to "impurities" in fertilizers i.e., "fertilizer grade"—because of the soil medium. Accordingly a fertilizer prepared for agronomic use could be prepared from a acid water that was a result of refining with NaOH without the loss in efficiency that was observed (predictably) with the plants grown "hydroponically". The K component could be added at a later time—as is often done by fertilizer cold blend plants (they buy nitrogen solutions and/or mix with MAP/DAP and then add K as muriate of potassium) just before application to a crop. Mixtures of NaOH and KOH could be used to maximize efficiency with cost in the refining step or KOH can also be added to the soapstock "day tank" (NaOH is presently used because of cost) to saponify the crude oil lost in the refining process that becomes part of the soapstock ("entrained oil" is the term used). NaOH used presently before acidulating to make sure all the oil is saponified before acidulation so that the amount of interphase (emulsion) is minimized. If K is used it has use as a fertilizer component. Here again KOH and NaOH could be blended.

Because the plants grown in the above described experiment, performed better than would be expected with a chemical feed having a relatively high concentration of sodium and chloride—there is evidence that something in the acid water or in the specific formulation method improves the efficiency of the feed.

Since some residual soap is present in the acid water, this can have a beneficial surface tension lowering effect that allows improved nutrient uptake by the plant. The glycerol (glycerine) present may also provide this adjuvant action. (Note: in a waste acid water stream glycerol is a high BOD component. In a fertilizer by-product stream it is beneficial). Also there may be some residual growth hormones that were not destroyed by alkali or acid. At any rate, acid water seems to have a beneficial-supplemental-synergistic effect on plant growth when utilized as a fertilizer. Further analysis and tests are expected to identify the exact mechanism of action.

Another fertilizer was prepared as follows:

a. Na soapstock was acidulated with $H_2SO_4$ solely.
b. Acid oil and acid water were separated.
c. The acid water was neutralized with $NH_4OH$.
d. The solution was concentrated by crude evaporation, i.e., heating on hot plate to ¼-1/5 original volume.
e. Upon cooling, 2 crystals formed; samples of each were taken.
f. The solution with crystals was redissolved by addition of water and evaporated to dryness crudely in an oven.
g. The final solid mass was analyzed, as were the 2 crystals sampled earlier.

The initial conclusions to be drawn from the experiments are:

1. 2 - distinct crystals form from the concentrated solution of different chemical evaporation.
2. This can be a method to manufacture solid crystals (fertilizer solids) or crystals for use in other commercial processes.
3. The method can be used to "purify" the fertilizer solution, since Na and $So_4$ are the predominant elements crystallizing out. It is a means to concentrate the $P_2O_5$ component in the solution since a small amount of Potassium in crystallized out.
4. This can be a method to manufacture a complex salt with the 4 primary fertilizer materials present:

K - N - P - S by starting with a crude oil refined with potassium.

5. This is a method to manufacture fertilizer using sodium hydroxide to refine crude oil and to produce a complex salt/s that can be used in commerce as well as the improved liquid balance remaining in the solution, as a fertilizer solution higher in potassium concentration and lower in Na and $SO_4$, although desirable, has the lowest dollar value as a nutrient.

6. There is a beneficial effect in solubility of N-P-K-S, that is "$Na_2SO_4$ is salted out-crystallized".

Nitric acid should be considered as an acidulating, or adjuvant acid as it is a practical way to formulate a fertilizer high in nitrate nitrogen. Also, since calcium nitrate is presently used as a plant food on pointsettias, $Ca(OH)_2$ can be useful neutralizer, provided that sulfates are not present as calcium sulfate (gypsum) precipitates out. It is also obviously possible to reduce the sulfate concentration in a fertilizer mixture by addition of Ca, if that is desired.

It may be preferable to use $Ca(OH)_2$ as a nutrient neutralizer of acid water to produce calcium phosphate for use as a feed supplement to animals.

It may also be preferable to refine crude oil with $Ca(OH)_2$ in order to have the Ca in the acid water, especially if the end use, as an animal fertilizer.

The end products may be used as animal feed supplements (animal fertilizer). There is evidence that soapstock from potassium-base refining makes a better poultry feed.

The glycerol in the fertilizer apparently has no deleterious effect on plant growth and, in fact, may prove to be beneficial adjuvant. It may, however, be problematic in manufacturing a solid product form the liquid feed stream.

Depending on the evaporator-crystallizer equipment, the solid end product can include the glycerol in the lattice or it should/can be removed, In the latter case the sweet water glycerol may be a by-product of the process.

It may be preferable and economical to put a distillation column on the evaporator and take the glycerin off in the vapor phase.

Ammonium Phosphate (di-ammonium phosphate—DAP) not only is a major plant fertilizer material, but is sold as feed grade DAP for animal feed supplements, for 50% more in price.

Experimental Results

Soapstock Acidulations

Soya soapstocks were acidulated with (A) phosphoric acid, and (B) a combination of sulfuric and phosphoric acids. The resultant acid oils and acid waters were analyzed for phosphate.

The results show that if phosphoric acid is used alone a relatively high percentage of phosphate (approximately 2.7%) is found in the oil, the balance substantially in the water. However, if sulfuric acid is used to first break the soap and phosphoric acid added to complete the acidulation, then only a minimal amount (0.7%) of phosphate is found in the oil. The acid water contains the bulk of the available phosphate, where it is wanted.

Note the additional philosophical difference where phosphates are now desirable in acid water. This process prefers the use of high phosphatidic oils that are non-degummed prior to refining. This discovery not only permits great flexibility in the varying of sulfate - phosphate percentages in the final product, but maximizes the recovery of soluble phosphate which is the most expensive component of mixed nutrient fertilizers.

Below is a tabulation of the phosphate analyses referred to above.

| ACIDULATION ANALYSES | | | | | |
|---|---|---|---|---|---|
| A. Acidulations using Phosphoric Acid alone | | | | | |
| pH | % $PO_4$ oil | % $PO_4$ water | Gms 100% $H_3PO_4$ used | Gms 100% $H_3PO_4$ in oil | Gms 100% $H_3PO_4$ in water |
| 6 | 2.36 | 2.73 | 3.20 | 0.74 | 4.90 |
| 5 | 2.76 | 4.11 | 6.50 | 0.87 | 7.50 |
| 4 | 2.86 | 5.40 | 10.00 | 0.90 | 9.80 |
| 3 | 2.35 | 5.99 | 11.20 | 0.74 | 10.80 |
| 2 | 2.93 | 6.59 | 13.20 | 0.92 | 11.90 |
| 1.5 | 3.04 | 8.43 | 16.30 | 0.96 | 15.30 |
| B. Acidulations using Sulfuric Acid to pH Values at Left, and Phosphoric Acid to pH 1.5 | | | | | |
| pH | % $PO_4$ oil | % $PO_4$ water | % $SO_4$ water | Gms 100% $H_3PO_4$ used | Gms 100% $H_3PO_4$ in water |
| 6 | 0.69 | 6.60 | 1.90 | 11.90 | 11.90 |
| 5 | 0.66 | 5.60 | 2.90 | 10.20 | 10.20 |
| 4 | 0.82 | 4.90 | 3.40 | 6.50 | 8.90 |
| 3 | 2.00 | 3.80 | 2.70 | 4.70 | 6.90 |
| 2 | 0.57 | 2.00 | 3.50 | 2.80 | 3.60 |

Material Balance and Cost Estimates

A. Refining with KOH

Potassium hydroxide will react in the same mole ratio as Sodium Hydroxide:

NaOH+RCOOH=RCOONa+$H_2O$ Mol. wgt
NaOH=40

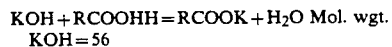
KOH+RCOOHH=RCOOK+$H_2O$ Mol. wgt.
KOH=56

If mol. wgt. KOH is divided by mol. wgt. NaOH, ratio=1.4 Therefore, 1.4 times (weight) KOH is required to refine the same quantity of oil if NaOH is used. Also NaOH costs approx. $350./ton and KOH costs approx. $570/ton. In a 30,000 lb/hr refining operation, using the equation below, this amounts to:

11,000 lbs NaOH per 24 hour day
15,500 lbs KOH per 24 hour day $$\text{wgt \% lye} = \frac{(\% \text{ FFA} \times 0.142 + \% \text{ excess lye}) \times 100}{\% \text{ NaOH or KOH in lye}}$$

This change results in an approximate loss of $250.00 per day for a 30,000 lb/day refinery operating 24 hrs a day. This analysis should be used as a guide. Actual usage and cost figure should be employed when making comparisons.

B. Neutralization of Acid Water with Ammonia

Ammonia will react with sulfuric acid and phosphoric acid in the same mole ration as sodium hydroxide (Simplified equations).

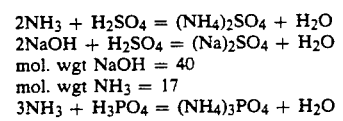
$2NH_3 + H_2SO_4 = (NH_4)_2SO_4 + H_2O$
$2NaOH + H_2SO_4 = (Na)_2SO_4 + H_2O$
mol. wgt NaOH = 40
mol. wgt $NH_3$ = 17
$3NH_3 + H_3PO_4 = (NH_4)_3PO_4 + H_2O$ -continued $$3NaOH + H_3PO_4 = (Na)_3PO_4 + H_2O$$

If the mol. wgt of NaOH is divided by the mol. wgt NH$_3$ the ratio is approximately 0.25. Therefore, it takes only ¼ the weight of NH$_3$ to neutralize an equivalent amount of acid water containing sulfuric and phosphoric acids when compared to neutralizing with NaOH. Also ammonia costs approx. $180/ton vs NaOH cost of approx. $350/ton. This change results in an 87% reduction in the cost of neutralization. Again actual cost and usage figures should be used as the basis of a comparison.

Crystallization Experiments

I. Soapstocks created from the refining of soy-bean oil with caustic soda (NaOH) were adiculated with sulfuric acid and the acid oil separated from the acid water.

The acid water (pH approximately 2.0) was neutralized with ammonium hydroxide.

The solution was concentrated by evaporating water until 20–25% of the original volume remained. The supersaturated solution was allowed to cool to room temperature and sit for several days.

Upon observation, three (3) phases were present: a brown, sticky mass comprised the bulk of the material. This semi-crystalline-solid material was undoubtedly degraded from the excess heat used to evaporate the water. Also present were two (2) crystal phases: A. the first crystals were tiny, granular and light brown in color. B. the other crystals were large, elongated and white.

Upon analysis of the three materials, the results showed:

1. Brown Mass
   N—7.20%
   P as P—3.40%; as P$_2$O$_5$—7.80%
   Na—8.10%
   S as SO$_4$—6.75%
2. Small Brown Crystals
   N—5.30%
   P—1.14%
   Na—8.99%
   SO$_4$—6.32%
3. Large White Crystals
   N—5.30%
   P—0.45%
   Na—8.90%
   SO$_4$—9.37%

II. Sodium soapstocks were created as above and acidulated. The acid water (H$_2$SO$_4$ used) and acid oil were separated. The acid water was used as a starting material to make horticultural fertilizer.

To the acid water was added sufficient phosphoric acid to supplement the naturally occuring phosphate from phosphotides to bring the final analysis to approximately 17% P$_2$O$_5$. Supplemental N was added first as ammonium nitrate. The solution was now neutralized with potassium hydroxide and allowed to cool to about 100–125F.

The remainder of the N was added as urea. The solution was allowed to sit for several days and then observed. Crystals were observed in the bottom of the vessel. These were analyzed and the results are as follows:

1. Large White Crystals:
   N as nitrate N—15%
   N as ammonium N—0.5%
   P as P$_2$O$_5$—1.65%
   K as K$_2$O—44.85%
   Na—0.12%
   Cl—0.08%
   S as So$_4$—12%

These crystals are predominantly potassium nitrate with some ammonium phosphate and trace amounts of Na, SO$_4$ and Cl.

All of the materials produced from experiments I and II can be used as fertilizer materials as is. In case II, potassium nitrate is a premium fertilizer material and commands a high price. This is an unexpected result in that Potassium Sulfate is less soluble and would be expected to crystallize first. These processes can be used to either produce the crystals for sale as solid fertilizers, or used to adjust the concentration of ions in the solution phase (liquid fertilizer).

We compared a liquid fertilizer made by the process of the invention to Peters 20-20-20, an industry standard. We looked at pot mums and bedding plants as tested crops.

The bedding plant group included petunias, impatiens, marigolds, and tomatoes. Pot mums variety yellow mandalay grown 5 cuttings per 6 inch pot.

Fertilizer rates of 100, 200, and 400 ppm N was selected as a constant feed.

Observations

Bedding Plants: Very few differences were observed between the groups because greenhouse temperature were too warm during the summer resulting in stretched plants. The best visually rated was the Peters 20-20-20 ppm N. This is based on color and growth.

Pot Mums: The top rated plants were Peters 20-20-20 @ 200 ppm N, and Daniels @400 ppm N. The 100 ppm rates were shorter with smaller diameters. The 100 ppm Daniels was the smallest plant. Some lower leaf yellowing was noticed on the Daniels 100 ppm N rate showing up about the 4th week and remained throughout the test.

The 200 ppm Daniels was 2 inches shorter than Peters 200 ppm N. Both the 400 ppm rates showed an excess of nitrogen with stiff brittle foliage.

Root systems were visually different with the 100 ppm Daniels showing the most white roots around the soil ball.

Overall crop timing was comparable with approximately 5 days between the first open group and the last open group. The 100 ppm Daniels was the last group to open with the 400 ppm Daniels 400 ppm Peters and 200 ppom Peters being the first groups.

The physical handling and mixing of the liquid fertilizer was easier than the dry Peters. It is easier to measure the liquid and blend the concentrate solution. Mold growth was observed on the stock experimental solution but was not noticed on the dilute solutions.

Overall, the liquid fertilizer is easier to handle, but the comparative growth was less with the liquid fertilizer.

Results are available from soil and foliar samples taken from roses grown in Massachusetts and fertilized by a product according to the present invention.

The data shows that the nutrient intake is better than one might expect from any fertilizer that is presently commercially available. The basis of this observation is the comparison of soil nutrients and foliar nutrients. The analyses show that given a constant feeding program the nutrients in the soil are lower over time and the same nurients in the leaf are higher over time, indicating that the elements are being strongly assimilated by the plant mechanism. This is a preferred situation since it means that the fertilizer of the invention gets more nutrients where they belong in a given feeding program; this means a strong, healthier and more productive plant. Or, stated another way, the grower could actually use less fertilizer to obtain the desired level of nutrients in the plant for peak performance.

Also another significant observation is that plants grown with the fertilizer of the invention are (from visual observation) at least as good, if not better, than plants grown with the commercial mix. This is significant in that the commercial mix is formulated with almost all nitrate nitrogen, the form that the plant assimilates it. Nitrate nitrogen is recommended for greenhouse plants grown during periods of low light and colder temperatures, i.e. Fall and Winter months in the northerly climates. The fertilizer made by the invention was, in this case, 75% ammonium and urea nitrogen, and only 25% nitrate nitrogen. The former two are considered dangerous to use during the winter as they may not be converted to the nitrate form and can build up in the soil/medium and cause a toxic condition. At any rate, nitrates are preferred over urea and ammonium since they perform better in the Fall/Winter.

The fertilizer of the invention performs visually at least as well as the more expensive commercial fertilizer, and better from a nutrient foliar analyses13 which is much more meaningful, particularly over the long term.

The testing was performed by two highly respected rose growers on different varieties of roses from September through Valentines Day harvesting. The roses were fed on a constant feed basis (a fertilizer injector was used) for 5 months without interruption at the same level of nutrient as the roses fed in normal fashion with their regular fertilizer.

Neither grower knew that the fertilizer they were testing had anything to do with soybean oil refining "waste". They only understood that they were to test a new liquid fertilizer under their field growing conditions and compare the results with plants grown with their regular fertilizer.

Montgomery Rose Company, Hadley, Mass. is the largest rose grower in the Northeast. Southwick Greenhouses, Southwick, Mass., is a leading-edge grower employing state-of-the-art, computer-controlled growing techniques.

The data indicates that:
1. nutritional levels of major, minor and trace elements in the plant were as high or higher than the regular fertilizer. This indicates excellent solubility or availability of all elements to the plant. It is important to note that the test plants were fed only the fertilizer of the invention for 5 months. The other plants were fed with several fertilizers as the chemical compatibility of the many nutrients are such that insoluble precipitates are formed.
2. No adverse reactions were found in either the plants tested or the soil as a result of the new fertilizer. This shows that the fertilizer is both safe for use as well as efficacious.
3. Plants fed with the fertilizer of the invention produced crops with higher yields and quality than plants fed with regular fertilizer. Southwick reported the same number of roses produced, but the Daniels plants had a higher proportion of longer stems than the regular plants. It is interesting to note that Southwick spent 4 years developing their fertilizer blend and program. The experimental product produced better results the first time. Montgomery reported that they got a 10 percent greater crop yield than their regular fertilizer produced and they considered 4 blooms per plant to be "extraordinary". Since all conditions were the same and the only variable was the fertilizer used, it can be concluded that the fertilizer of the invention was superior in that it produced a greater crop with more valuable (i.e. longer stem) units.
4. It should also be noted that the makeup of nitrogen in the Daniels fertilizer was approximately 20 percent nitrate and 40 percent each of ammonium and urea nitrogen. The fertilizer used regularly by both Montgomery and Southwick is primarily nitrate nitrogen as that is the preferred form of nitrogen during the Fall and Winter growing months of low light and cold temperatures. The overall results of the experimental fertilizer are even more impressive given that the nitrogen sources were less than optimum. This can be indicative of a adjuvant effect of the aqueous carrier (acid water) that improves nutrient absorption.
5. Because of the excess chelate in the product, growers noticed that little or no sludge was formed in the bottom of their makeup tank. Their regular fertilizers cause a substantial insoluble precipate to be found as a result of impurities in the mix or hardness in the water. Since insolubles can clog fertilizer/watering lines, the fertilizer of the invention offers a distinct advantage.
6. The fertilizer of the invention being a liquid, needed only to be mixed with water to produce a "stock solution". Conventional solid fertilizers need to be dissolved in hot water (a negative heat of solution is inherent in these products) and then allowed to settle out and then decanted to minimize insolubles. An hour or more is spent in this operation. The fertilizer of the invention requires no time to mix and has no insolubles.

All soil and foliar analyses were performed by a reputable consulting laboratory.

Description of Test

Fertilizer prepared as a by-product of soybean oil refining was supplied to growers as a 5 gallon, 50 pound unit of 7.5 - 10 - 8 liquid (equivalent to a 25 lb bag of dry mix 15-20-16).

The growers had no idea of the basis of manufacture of the fertilizer. They were only aware of a new liquid fertilizer in pre-production tests made by the Daniels Fertilizer Company.

They agreed to use the new fertilizer in actual growing conditions and to compare results with plants grown with their regular feed. Test areas in the greenhouse were selected so that conditions would be representative of typical conditions. Both the test beds and the rest of the plants were fed the same level of nutrient based on ppm of nitrogen. The plants were fed on a constant feed basis using a fertilizer proportioner with the watering system.

Fall-Winter testing was conducted on high grade roses by two growers: Southwick Greenhouses, Southwick, Mass. and Montgomery Rose Company of Hadley, Mass. Both growers are considered highly professional leaders of their inductry with Southwick a smaller, highly controlled grower and Montgomery the largest rose grower in the Northeast (285,000 plants).

Foliar and soil analyses were performed on samples from both locations in October, November, December, January and February for Major, Secondary and Minor elements Both the test beds and regular beds in the greenhouses were sampled and compared for differences.

Crop counts and grades were conductd when the roses were harvested for Valentine's Day.

A report of soil and foliar analyses findings is included by the laboratory conducting the tests and a questionnaire completed by the grower involved with the test is provided.

Additional tests are in progress in New York, New Jersey and Connecticut on Spring crops such as mums. Results will become available in May.

Samples were taken at both locations from October through January which is about one full cycle of rose production. Soil and foliar samples were taken from rose beds fed with Daniels (fertilizer of the invention) and equivalent rose beds fed with the normal fertilizer in use at the particular greenhouse range. The amounts of fertilizer used per feeding were adjusted so that the test fertilizer and the normal fertilizer were fed in about the same quantities per nutrient content.

Both the soil test reports and the foliar analysis report will offer valuable results and conclusions. it is important here not to compare one range with the other since many differences exist between them, like for instance differences in soil, pH, watering practices, greenhouse management and other cultural practices.

The soil tests done by the Chemical Consulting of Babylon are of a type that tests for pH, soluble salts, and such nutrients as nitrates, ammonium nitrogen, phosphate, potassium, calcium, magnesium, iron and manganese. All test results indicate the amounts of the elements readily available to the plants at the time the soil is sampled.

Generally, good conditions and fertility for roses are:

| Test | Good Range |
| --- | --- |
| pH | 5.8–6.5 |
| Soluble Salts | 20–60 mmhos |
| Nitrate Nitrogen | 20–60 ppm |
| Ammonium Nitrogen | 0.5–5 ppm |
| Phosphate | 10–25 ppm |
| Potassium | 16–40 ppm |
| Calcium | 150–220 ppm |
| Magnesium | 10–30 ppm |
| Iron | 0.5–2 ppm |
| Maganese | 0.5–2 ppm |

Despite the different conditions existing in the two testing locations, the soil tests indicate generally adequate fertility levels even when pH conditions are below the ranges that are considered best for roses. The fertilizer of the invention maintained pH and fertility levels at the same or better levels than the areas it is compared to.

It must again be kept in mind that the application rate of the fertilizers for the test beds and the regular beds are adjusted to be equal in strength to provide nutrition to the roses.

The soil test is quite accurate especially when used steadily over a long period of time and it will become a very clear indicator of what is going on in the soil. It also must be understood, like in all general testing, a fluctuation in results of about plus or minus 5% is normal.

Foliar analysis was carried out on the same locations where soil tests were taken. Foliar analysis is much more involved but also a much better predictor and indicator of nutritional conditions in the plants.

The foliar analysis is done for all the elements listed below with the standard ranges for roses given as well. Values below the standard ranges are considered to be deficient.

| Test Element | Standard Range |
| --- | --- |
| Nitrogen | 2.8–5.0% |
| Phosphorous | 0.20–0.30% |
| Potassium | 1.80–3.0% |
| Calcium | 1.0–2.0% |
| Magnesium | 0.20–0.35% |
| Aluminium | 50:350 ppm |
| | (ppm = parts per million) |
| Boron | 30–60 ppm |
| Copper | 5–15 ppm |
| Iron | 50–250 ppm |
| Manganese | 30–250 ppm |
| Zinc | 15–50 ppm |
| Molybdenum | 5–15 ppm |
| Sodium | 25–1500 ppm |

The evaluation of the foliar analysis results dating from October 1987 to January 1988 indicate very steady levels of all nutrients in the standard range. In comparing the results to beds with normal fertilizers used in the range, it can be pointed out that levels with the experimental fertilizer showed up well. Especially the trace element levels remained well above the lower range of the standard conditions and often were higher than found in samples from other areas. It is important here to indicate that the levels were maintained at a time when stresses in roses are common because of artificial lighting. This stress is often indicated by a drop in the trace element levels and can become deficient.

Poor leaf size and off colored leaves, as well as leaf drop, were not found at the Southwick or the North Hadley test sites. Leaves were generally fully developed with a dark green and healthy color.

Foliar samples were taken at the North Hadley location from November, 1987 through January, of 1988. This allowed again to observe the nutritional status of roses from a complete cycle under differennt conditions and a different location. No artificial lighting is in use in North Hadley. The results indicate that the test beds showed excellent nutritional conditions and compared well again to the areas fed with regular fertilizers. They did as well or better and even some increases can be seen in the element levels. The best can be seen in the manganeses levels which steadily went up.

The color and leaf size was also excellent at North Hadley.

Conclusions

The conclusions that can be drawn from the test results are as follows:
(1) The fertilizers performed well in the results indicated by the soil tests and the foliar analysis.
(2) In some instances, it performed even better than the regular fertilize in use.
(3) Minor elements, because the complete liquid nature of the fertilizer, seem to be better distributed, which explains the increase in some minor element levels indicated in the foliar test results.

(4) No toxicity or adverse conditions indicated because of the nature of the fertilizer or its manufacturing.

(5) Fertilizer did not influence or change pH conditions during the time of testing. This will be an important factor in the merchandising of this product.

Industrial Applicability

The by-product created by the Daniels Process is a completely soluble multinutrient fertilizer for use on all major crops. The cost to industry to implement this environmentally desirable process is actually less than their current waste disposal practice. Nevertheless, industry is slow and reluctant to change. The Daniels Process is a closed loop, zero discharge system.

In 1986–1987 more than 12 million metric tons of vegetable oils (10 million of which is soybean oil) will be refined in the United States. A waste product in phosphorus pollution alone equivalent to 1,000,000 metric tons of phosphoric acid will be created.

With appropriate standards and legislation an alternative process could be encouraged with benefits to the environment, the public whose tax dollars are spent processing an unnecessary waste load, and the nation's farmers who would welcome a low cost by-product fertilizer.

The refining of crude vegetble oils for edible use is concentrated in the midwest, west and southern agricultural sections of the U.S.—close to the source of oilseed crops such as soybeans, cottonseed, corn and sunflower. Given the fact that 2 billion bushels of soybeans yielding 14.3 million tons oil for refining, a waste of significant proportion is generated.

AGRICULTURAL/ENVIRONMENTAL TRENDS

Although fertilizer prices are severely depressed, the industry has begun a rebound. More importantly, several trends point to higher prices, greater usage and potential shortages by the end of the century. The macroeconomic trends in place strongly suggest increasing value of by-product fertilizers and the Daniels Process.

There are two trends that should have a favorable impact on the use and value of the inventions(s):

(1) WORLD POPULATION GROWTH—The U.S. Census Bureau predicts that the world's population will grow from 4.6 to 8.0 billion people in the next 25 years. This should increase the demand for fertilizers employed to maximize crop yields.

Experts are predicting a "worldwide fertilizer crunch" by the year 2000 unless some 200 new world-scale plants are built and existing facilities refurbished. Dr. Guido P. Giusti, president of Texasgulf Inc. (Stamford, Conn.) estimated that $108 billion in capital would be required to avert the crisis. Dr. Earl Batz points out that less farm acreage will be available to feed more people. Therefore, crop yields must be increased with high quality fertilizers.

(2) ENVIRONMENTAL PROTECTION AGENCY IMPACT—As E.P.A with public support continues to legislate and implement stricter air and water purity standards, the importance and potential value of technologies that permit compliance with the law should increase accordingly. A closed-loop, zero discharge system is in keeping with the waste minimization, by-product process trends being advocated.

The process of the invention allows an agricultural-environmental dual benefit to take place. A significant waste is eliminated and a product of use is created.

Statistics on sales of fertilizers to the horticulture and hydroponic markets are hard to come by. However, estimates place them at around $200 million, a relatively small segment of the multibillion-dollar total fertilizer market. With exciting growth possiblities immediately ahead for the floriculture business, prospects for the premium fertilizer market are equally promising. When this approaching growth phenomenon is coupled with a new technology to produce products that are superior in purity, more convenient to use, and lower in cost, then it is easy to understand the industrial applicability of the invention.

Products

The process of the invention is able to produce liquid blends of chemicals containing all necessary elements (major, minor and trace) to produce a complete, pH balanced plant food. Targeted for the professional horticulture market, the products are primarily packaged in five-gallon units. Each unit is designed with the grower in mind. The cube is equivalent to the competitions' 25-pound bag of dry fertilizer and simplifies the preparation of stock solutions. Also, the five-gallon unit is more efficient in space utilization which lowers shipping costs and facilitates storage and handling. Bulk quantities will also be offered in 10,000-gallon tank trucks and rail cars. Pricing will vary depending upon raw material costs, quantities and discounts.

In addition to being easier to use, time-saving and space-efficient, the products are superior in purity to commercial preparations. As was stated earlier, a 20-20-20 blend of fertilizer represents 20% nitrogen, 20% phosphorous and 20% potassium. In a 25-pound bag of "Peters", for example, this amounts to 15 pounds (60%) of usable nutrients. The remaining 40% is solid filler that may build up in the soil or growing medium with potentially harmful effects to crops In the fertilizer of the invention's 20-20-20, the other 40% is essentially water.

These unique features offer impressive competitive advantages over existing products.

Potential Market

There are approximately 300 refineries throughout the world, 100 of which are in the U.S., that could potentially utilize this technology.

Estimated Cost

A unit of typical size would cost approximately $750,000.

Utility Usage

Approximately 120 kWh/day are consumed.

Clearly, minor changes may be made in the form and construction of this invention without departing from the material spirit of it. Therefore, it is not desired to confine the invention to the exact form shown here and described, but it is desired to include all subject matter which properly comes within the scope claimed.

I claim:

1. A method of processing vegetable oil so that waste streams from the process are provided with enhanced usefulness as nutrient sources, comprising the steps of:

(a) harvesting oil-containing vegetables from a growing area,
(b) extracting crude vegetable oil from the vegetables,
(c) forming a soapstock by refining the crude oil with a base, the components of which have low toxicity to plants or animals,
(d) separating the refined oil from the soapstock,
(e) treating the resulting soapstock with an acid, the components of which have low toxicity for said plants and animals, to form a mixture of an acid water phase and an acid oil phase,
(f) separating the resulting acid oil from the resulting acid water phase, and
(g) utilizing the nutrients contained in said acid oil and or acid water phases.

2. A method as recited in claim 1, wherein said acids and said bases, whose components have low toxicity to said plants and animals include nutrient components whereby the nutrient value of said acid oil or said acid water phases is enhanced.

3. A method as recited in claim 1, including the additional step of:

after step (f), treating the acid water by adding sufficient materials from the group consisting of:
a nitrogen source, a phosphorous source, a potassium source, a micronutrient salt source, and a micronutrient chelate source in excess of the amount required to chelate the micronutrients, to make an appropriate fertilizer concentration for said plane.

4. A method of processing vegetable oils and by-products including the steps of harvesting oil-containing vegetables from a growing area, extracting crude vegetable oil from the vegetables, and forming a soapstock by refining the crude vegetable oil with base; separating the refined vegetable oil from the soapstock; treating the resulting soapstock with an acid to form a mixture of an acid water aqueous phase and an acid oil; separating the resulting acid oil from the resulting acid water aqueous phase; characterized by the step of:
applying the aqueous phase as a fertilizer to soil or growing plants.

5. A method as recited in claim 4, further comprising the step of:
before applying the aqueous phase as a fertilizer, testing the aqueous phase for nutrients and enriching it as needed.

* * * * *